3,055,932
UNSATURATED ESTERS OF FLUORINATED GLYCOLS
Carl J. Verbanic, Grand Island, and Claude Thomas Bean, Jr., Niagara Falls, N.Y., and Paul Robitschek, Granville, Ohio, assignors to Hooker Chemical Corporation, Niagara Falls, N.Y., a corporation of New York
No Drawing. Filed Apr. 27, 1960, Ser. No. 24,908
4 Claims. (Cl. 260—486)

The present invention relates to novel unsaturated esters of fluorinated glycols and acyl halides.

It is an object of the present invention to prepare novel compositions of matter which are useful in the formation of polymeric materials for high temperature applications. It is a further object of the present invention to prepare novel compositions of matter useful as cross-linking agents for polyester resins, thereby imparting excellent high temperature resistance to the resultant product. Further objects and advantages of the present invention will appear hereinafter.

The compositions of the present invention have the following structural formula:

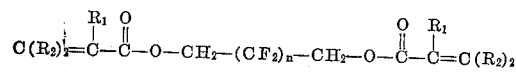

wherein $n$ is an integer of from 1 to 6, and wherein $R_1$ is selected from the group consisting of hydrogen, halogen, and alkyl containing from one to seven carbon atoms, and wherein $R_2$ is selected from the group consisting of hydrogen and fluorine.

The compounds of the present invention may be used to prepare thermoset polymeric materials having extremely good high temperature resistance, whereas the thermoset polymeric materials prepared from the unfluorinated counterparts are characterized by poor thermal stability.

The compositions of the present invention may be prepared in accordance with the following equation:

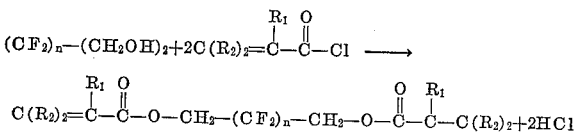

In the above reaction the diol and the acid chloride are preferably reacted together in an anhydrous solvent boiling at a temperature of from sixty to one hundred and twenty degrees centigrade. The solvent should be inert with respect to the reactants and reaction products. Typical solvents include benzene, toluene, carbon tetrachloride, chloroform, etc. The reaction is preferably run at reflux, but the reaction temperatures may vary depending upon the reactants used, time of reaction and degree of completion of reaction desired. Similarly, the time of reaction may vary depending upon the reaction temperature, reactants used and degree of completion of reaction desired. Generally, however, the reaction is continued until HCl evolution ceases. Molar proportions of reactants or an excess of either reactant may be employed; however, it is preferred to employ a slight excess of acid chloride in order to take care of any water present and due to low cost. It is also preferred but not essential to use a small amount of any of the polymerization inhibitors known in the art, for example, copper powder, sulfur, quinone, hydroquinone, etc.

The fluorinated diols which may be employed in the present invention are the following:

Difluoropropane diol, where $n=1$
Tetrafluorobutane diol, where $n=2$
Hexafluoropentane diol, where $n=3$
Octafluorohexane diol, where $n=4$
Decafluoroheptane diol, where $n=5$
Dodecafluorooctane diol, where $n=6$ Diols of this type are known in the art and are generally prepared starting with the corresponding 1,2-dichloroperfluorocycloalkene, oxidizing the double bond to a dicarboxylic acid and then reducing the dicarboxylic acid to the glycol.

The acid chlorides which may be employed are known in the art and include the following compounds:

Acrylyl chloride
Methacrylyl chloride
Ethacrylyl chloride
Propacrylyl chloride
Butacrylyl chloride
Pentacrylyl chloride
Hexacrylyl chloride
Heptacrylyl chloride
α-Chloroacrylyl chloride
α-Fluoroacrylyl chloride
Perfluoroacrylyl chloride
β,β-Difluoroacrylyl chloride The following examples are found:

EXAMPLE 1

*Preparation of Hexafluoropentamethylene Diacrylate*

Hexafluoropentane diol and acrylyl chloride were mixed together (using a slight molar excess of acrylyl chloride), in a benzene solution. The mixture was refluxed for eighteen hours, at which time the hydrogen chloride evolution ceased. The benzene was then removed by means of a water aspirator vacuum and the oily residue vacuum distilled. The product was obtained in an eighty-nine percent yield of hexafluoropentamethylene diacrylate having a boiling point of one hundred and five degrees centigrade at one millimeter pressure. Saponification No., found three hundred and sixty-four, theory three hundred and fifty.

EXAMPLE 2

*Preparation of Hexafluoropentamethylene Dimethacrylate*

To one hundred grams of hexafluoropentane diol was added one hundred and ten grams of methacrylyl chloride, one gram of hydroquinone and one hundred and fifty milliliters of benzene, all in a five hundred milliliter flask. The mix was heated to reflux (eighty degrees centigrade) and hydrogen chloride was evolved. The mixture was refluxed for twenty hours until evolution of hydrogen chloride ceased. The material was distilled to remove the benzene and then under high vacuum to purify the ester. The distillate had a refractive index of 1.403 at twenty-eight degrees centigrade and a specific gravity of 1.2537.

EXAMPLE 3

*Preparation of a Thermoset Casting*

A five gram sample of the dimethacrylate prepared in Example 2 was catalyzed with one percent (0.05 gram) of Luperco ATC, a fifty percent suspension of benzoyl peroxide in tricresyl phosphate. The resulting catalyzed solution was placed in a test tube in a fifty degrees centigrade oven overnight. After twenty-four hours, hard, clear thermoset casting having extremely good resistance to high temperature degradation had been obtained.

EXAMPLE 4

*Preparation of Octafluorohexamethylene Diacrylate*

To 2.62 grams of fluorohexane diol was added three milliliters of acrylyl chloride. The mix was allowed to stand three days at room temperature. At the end of this time the theoretical amount of hydrogen chloride had been evolved and the excess acrylyl chloride and other by-products were stripped off under vacuum leaving octafluorohexamethylene diacrylate, leaving a saponification number of three hundred and three.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:
1. A composition of matter having the following structural formula:

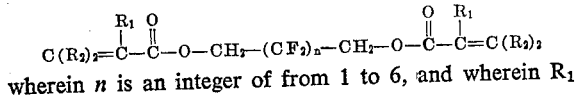

wherein $n$ is an integer of from 1 to 6, and wherein $R_1$ is selected from the group consisting of hydrogen, halogen and alkyl containing from 1 to 7 carbon atoms, and wherein $R_2$ is selected from the group consisting of hydrogen and fluorine.

2. Hexafluoropentamethylene diacrylate.
3. Hexafluoropentamethylene dimethacrylate.
4. Octafluorohexamethylene diacrylate.

References Cited in the file of this patent

UNITED STATES PATENTS

| | | |
|---|---|---|
| 2,129,722 | Woodhouse | Sept. 13, 1938 |
| 2,628,958 | Bittles | Feb. 17, 1953 |